United States Patent [19]
Bickel et al.

[11] 3,931,881
[45] Jan. 13, 1976

[54] CONTINUOUS BELT SYSTEM HOLDING MULTIPLE LAYERS

[75] Inventors: Frederic W. Bickel, Burbank; Richard L. Long, Manhattan Beach, both of Calif.

[73] Assignee: McDonnell Douglas Corporation, Long Beach, Calif.

[22] Filed: Oct. 2, 1973

[21] Appl. No.: 402,794

[52] U.S. Cl. ............... 198/165; 198/180; 226/109; 226/172; 226/173; 271/205; 156/79; 156/543
[51] Int. Cl.² ..................................... B65G 15/14
[58] Field of Search ........... 198/163, 165, 180, 192, 198/202, 179; 271/205; 226/109, 110, 170, 172, 173; 270/32, 52, 53; 156/79, 543

[56] References Cited
UNITED STATES PATENTS

| | | | |
|---|---|---|---|
| 1,258,001 | 3/1918 | Hammersmith.................. | 271/205 X |
| 1,644,462 | 10/1927 | Bachofen ............................ | 198/180 |
| 1,991,137 | 2/1935 | Case et al. ......................... | 271/205 |
| 2,557,492 | 6/1951 | Young ................................ | 226/170 |
| 2,568,174 | 9/1951 | Staacke.............................. | 198/192 |
| 2,821,383 | 1/1958 | Clemens ............................ | 270/52 |
| 2,861,674 | 11/1958 | Reist.................................. | 198/180 |
| 2,920,748 | 1/1960 | Heywood.......................... | 198/180 |
| 3,100,637 | 8/1063 | Brown................................ | 271/205 |
| 3,256,558 | 6/1966 | Andersen et al.................. | 226/172 |
| 3,286,817 | 11/1966 | Brigham............................ | 198/179 |
| 3,323,703 | 6/1967 | Wibbing et al. .................. | 226/173 |
| 3,323,703 | 6/1967 | Wibbing et al. .................. | 226/173 |
| 3,395,784 | 8/1968 | Kanarek............................ | 198/165 |

*Primary Examiner*—Richard A. Schacher
*Assistant Examiner*—R. K. Thomson
*Attorney, Agent, or Firm*—Walter J. Jason; John P. Scholl; Donald L. Royer

[57] ABSTRACT

A continuous belt system engaging and holding for parallel motion multiple layers of fabric. A pair of belts holds the layers along their edges in stacked spaced relationship while the layers pass through tufting and foaming stations in the manufacture of three-dimensional reinforced insulation.

3 Claims, 3 Drawing Figures

CONTINUOUS BELT SYSTEM HOLDING MULTIPLE LAYERS

BACKGROUND OF THE PRESENT INVENTION

Natural gas from foreign countries is shipped to this country in liquid form to save space. In its gaseous state its volume is on the order of 500 times its liquid volume. To retain the gas in its liquid form it must be retained at cryogenic temperatures. Some temperatures, however, cause imbrittlement of the storage tank steel. Hence the need for improved insulation in the tanks.

Foam insulation layers were first applied to the tank interior walls. However, as the liquid gas would penetrate the foam, heat up and expand, the gas would rip off chunks of insulation. The problem was solved by using a matrix of three-dimensional fibers within the foam and bonded securely to the tank wall. Several methods have been devised in accomplishing this.

One method of manufacturing a three-dimensional fabric reinforced foam insulation is to position several layers of open weave fabric netting in spaced stacked relationship and lock the layers together with tufting stitching. This passes multiple loops of threads through the layers. Thereafter the foaming operation embeds the matrix in the foam insulation which then may be used after it has cured.

In making blocks of insulation, the multiple layers of fabric are suspended in stacked frames of desired size. After foaming and curing, the frames are cut from the blocks and cleaned for re-use or are discarded. This is a low-volume production technique.

A high-volume endless strip of insulation on a low cost production basis is needed to place the aforementioned three-dimensional insulation in a financially competitive position. A method and apparatus must be developed for this purpose.

SUMMARY OF THE PRESENT INVENTION

In accordance with the present invention an endless belt system is designed to grip the side edges of multiple stacked and spaced fabric from multiple rolls of open weave netting. The belt system moves the fabric past the tufting machine and foaming station and supports the fabric in position until the insulation has cured.

The endless belts on either side of the fabric have horizontal parallel slits which are spread open by making a convex bulge with rollers between the top and bottom edges of the belt. At a point downstream the belts are caused to have a concave curvature whereby the slits close over and frictionally grip the fabric edges. The belts on either side transport the layers of fabric along the various work stations to the downstream end of operations. At this point the belts are caused to bulge in a convex direction to open the slits at that point so the belts disengage with the edges of the fabric. The belts make the return loop while the fabric continues downstream to its terminal station. Devices are positioned along the path of the belts to cause them to be concave or convex as desired and to stretch the fabric taut between the belts.

DETAILED DESCRIPTION OF ILLUSTRATIVE EMBODIMENT

Figure 1:
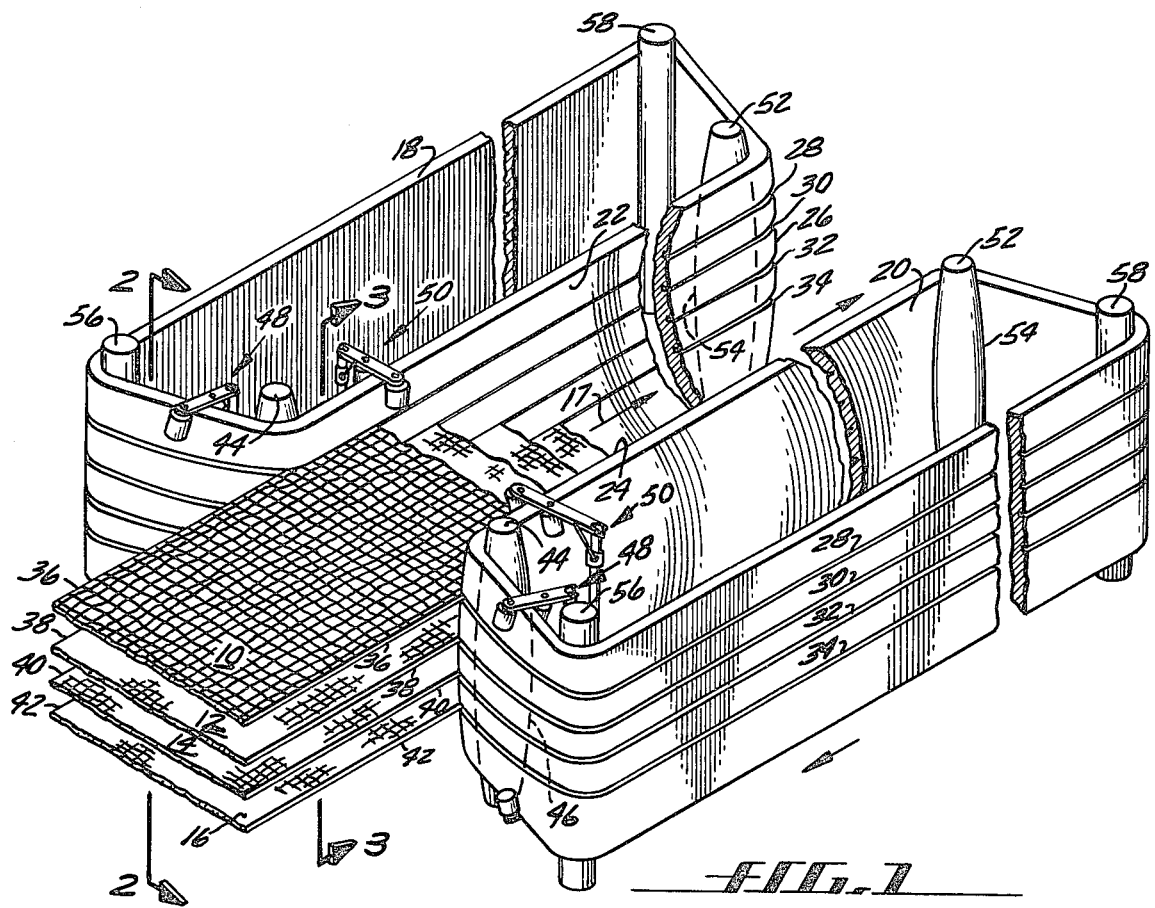
FIG. 1 is a perspective view of the belt system for moving multiple spaced layers of fabric.

Referring now to FIG. 1 there is shown a plurality of stacked spaced layers 10, 12, 14, 16 of fabric netting of the type used in making reinforced foam insulation such as set forth in copending applications Ser. No. 385,314 and Ser. No. 385,313 filed 3 Aug. 1973. These layers preferably are from rolls to form an endless supply or they may be of finite length. They may be flexible or limp or they may be rigid or semi-rigid as desired.

A pair of endless belts 18, 20 have substantially vertical parallel surfaces 22, 24 which define the path of travel of fabric layers 10, 12, 14 and 16. This path, shown by arrow 17 and defined by belt surfaces 22 and 24, guides the layers through various stations, not shown. At one station they are connected yet spaced with vertical fibers or threads to form a three-dimensional reinforcing network for foam insulation. Another station may be where the foam "boils" up through the network and cures as a composite. Still another station may be where the composite is cut or trimmed to some desired size. Further information concerning this system may be had with reference to copending application Ser. No. 402,721 filed 2 Oct. 1973, now U.S. Pat. No. 3,881,972. The purpose of belts 18, 20 is to grip and maintain the layers in position and move them through the various stations until they become self-supporting in the insulation composite. Thereafter the belts make a convex bulge 26 at the end of the belt path to open belt slits 28, 30, 32 and 34 and to free their grip on the layer edges 36, 38, 40 and 42 and return.

Rollers 44 on both sides of the layers define the commencement of the path of travel. These rollers are mounted on a vertical axis and have enlarged circumferences at their mid-sections 46 to maintain flexing of the mid-portion of the belts 18, 20 inwardly relative to the path of travel. A convex bulge device 48 at a point just before where the belts enter the path of travel initiate the convex flexing to enlarge the opening of the slits as will be explained when reference is had to FIG. 2. A concave curvature device 50 such as shown in FIG. 3 is positioned just beyond the start of the path of travel. This device closes the slits over the fabric edges to grip and frictionally retain the layers 10, 12, 14 and 16 in desired spaced relationship throughout their path of travel. Rollers 52 at the end of the path of travel are similar to rollers 44 in that they also have enlarged circumferences at their midpoint 54. Rollers 56, 58 and others not shown, are of uniform circumference since flexing is not desired at these positions along the endless belt loop.

Figure 2:
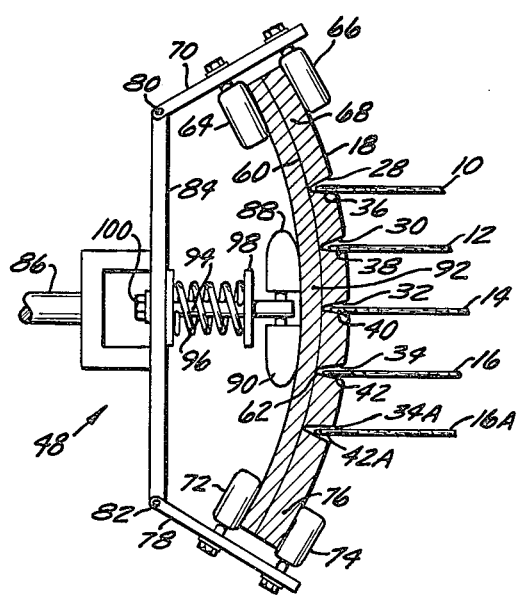
FIG. 2 is an elevational view along line 2—2 of FIG. 1 showing a device for effecting a convex bulge in a belt.
Figure 3:
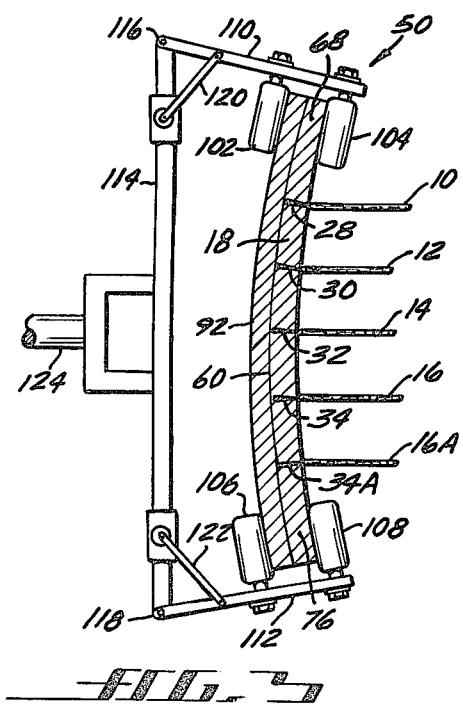
FIG. 3 is an elevational view along line 3—3 of FIG. 1 showing a device for effecting a concave bulge in the belt.

Reference is now made to the convex bulge device 48 shown in FIG. 2. Here is shown in section the endless belt 18 with five slits 28, 30, 32, 34 and 34A, instead of the four slits in FIG. 1. This is to illustrate that any number may be used. These slits preferably are equally spaced but they need not all be required for all applications. Any combination of layers 10, 12, 14, 16 and 16A may be used as desired. Belt 18 preferably is made of any rubber or plastic composition and preferably has a fabric reinforcement 60 at the apexes 62 of the slits to prevent tearing or other damage as the belt is flexed in use.

The convex bulge device 48 consists of a pair of rollers 64, 66 so positioned that the upper belt edge 68 is sandwiched in between. Preferably these rollers are mounted at their upper ends to a support bracket 70. Similarly, a pair of rollers 72, 74 are positioned so that the lower belt edge 76 is sandwiched in between. These rollers are mounted at their lower ends to a support bracket 78. Brackets 70 and 78 are pivotally connected at their rear ends 80, 82 to a support member 84 which is positionable relative to belt 18 by mounting 86.

The convex bulge of belt 18 is accomplished by a pair of centrally disposed pressure rollers 88, 90 urged against the midportion 92 on the backside of belt 18. These rollers are mounted on an axially extendable rod 94 over which is mounted a spring 96. This spring urges against support member 84 and a stop 98 on rod 94 and thus urges rollers 88, 90 against the midportion 92 to flex the belt 18. This widens slits 28, 30, 32, 34, 34A and permits entry into the slits of the layer edges at the commencement of the path of travel of the layers. A nut 100 threadedly mounted on the end of rod 94 may be used to adjust the axial movement of the rod and thus the pressure of the rollers 88, 90 on belt 18 for purpose of flexing.

As previously mentioned, a concave curvature device 50 is positioned on belt 18 to cause the belt to grip the edges of the layers and move them along a path of travel. One such device is shown in FIG. 3. Here a pair of rollers 102, 104 have the upper end 68 of belt 18 sandwiched in between and another pair of rollers 106, 108 have lower end 76 of belt 18 sandwiched in between. These pairs of rollers are mounted on support brackets 110, 112 respectively. These support brackets are connected to support member 114 at pivot points 116 and 118. Support links 120, 122 are attached to brackets 110, 112 respectively and are adjustably positionable on support member 114 to vary the angle of the pairs of rollers as they bear against the ends 68 and 76 of belt 18. This changes the amount of its concave curvature, as desired, to close the slits 28, 30, 32, 34 and 34A to retain the edges of layers 10, 12, 14, 16 and 16A. This keeps the layers moving with the belt. A mounting 124 attached to support member 114 may be used to move the device 50 laterally to regulate the tension on the layers as they are subjected to vertical stitching, foaming and other operations at the various workstations.

Having described an illustrative embodiment, other variations and modifications will occur to those skilled in the art and it is to be understood that these alterations are to be construed as part of the present invention as set forth in the appended claims.

We claim:

1. A continuous belt systems for holding multiple layers, said system comprising:
a pair of endless belts having vertical parallel spaced surfaces defining a path of travel;
said surfaces having gripping means thereon to retain multiple stacked and spaced layers therebetween;
said gripping means comprising closed slits in said surfaces;
means applying said gripping means to said layers at the start of said path of travel by opening said slits to permit insertion therein of edges of said layers and closing said slits after said edges are inserted;
said means for opening said slits comprising a convex bulge device for flexing the midportions of each belt inwardly toward each other including rollers on the top and bottom inside edges of said belts and rollers at the midsection of said belts on the outside surface thereof; and
means releasing said layers from said gripping means at the end of said path.

2. A continuous belt system as set forth in claim 1 wherein said means closing said slits is a concave curvature device flexing the midportions of each belt outwardly from each other, said concave curvature device including rollers on the top and bottom edges of said belts angularly oriented relative to the plane of said belt and bearing against said belt to flex said belt midportion outwardly.

3. A continuous belt system as set forth in claim 1 wherein said rollers are moveable relative to each other and to the path of travel of said belts.

* * * * *